(12) United States Patent
Zhang

(10) Patent No.: US 10,605,153 B2
(45) Date of Patent: Mar. 31, 2020

(54) FUEL INJECTOR HAVING THREE STAGES

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 591 days.

(21) Appl. No.: 15/335,907

(22) Filed: Oct. 27, 2016

(65) Prior Publication Data

US 2018/0119599 A1    May 3, 2018

(51) Int. Cl.

| F02B 19/02 | (2006.01) |
|---|---|
| F02M 26/71 | (2016.01) |
| F02M 67/06 | (2006.01) |
| F02M 26/37 | (2016.01) |
| F02M 26/51 | (2016.01) |
| F02M 26/70 | (2016.01) |
| F02M 26/01 | (2016.01) |
| F02M 45/00 | (2006.01) |
| F02M 57/00 | (2006.01) |
| F02M 61/14 | (2006.01) |
| F02M 63/00 | (2006.01) |

(52) U.S. Cl.
CPC ............ *F02B 19/02* (2013.01); *F02M 26/01* (2016.02); *F02M 26/37* (2016.02); *F02M 26/51* (2016.02); *F02M 26/70* (2016.02); *F02M 26/71* (2016.02); *F02M 45/00* (2013.01); *F02M 57/00* (2013.01); *F02M 61/14* (2013.01); *F02M 63/0038* (2013.01); *F02M 67/06* (2013.01); *F02M 2200/29* (2013.01); *Y02T 10/125* (2013.01)

(58) Field of Classification Search
CPC ........ F02D 19/02; F02M 26/01; F02M 36/37; F02M 26/51; F02M 26/37; F02M 26/70; F02M 26/71; F02M 45/00; F02M 57/00; F02M 61/14; F02M 63/0038; F02M 67/06; F02M 2200/29; F02B 19/02; Y02T 10/125
USPC ...... 239/88–96, 581.1, 5; 123/274–278, 449, 123/450
See application file for complete search history.

(56) References Cited

U.S. PATENT DOCUMENTS

| 2,371,787 | A | * | 3/1945 | Ward | ................. F02M 49/02 239/88 |
|---|---|---|---|---|---|
| 4,326,672 | A | * | 4/1982 | Goloff | ................. F02M 59/366 123/450 |
| 7,458,364 | B2 | | 12/2008 | Allen | |

* cited by examiner

*Primary Examiner* — Steven J Ganey
(74) *Attorney, Agent, or Firm* — Geoffrey Brumbaugh; McCoy Russell LLP

(57) ABSTRACT

An engine, fuel injector, and method are disclosed. The method may include aligning an exhaust gas passage with an exhaust gas source to allow exhaust gas to enter a pre-chamber for a first duration; aligning a fuel passage with a fuel source to allow fuel to enter the pre-chamber for a second duration; and aligning injector nozzle connectors with injector nozzles, for a third duration, to allow a mixture of the fuel and the exhaust gas to be injected from the pre-chamber to the combustion chamber.

17 Claims, 7 Drawing Sheets

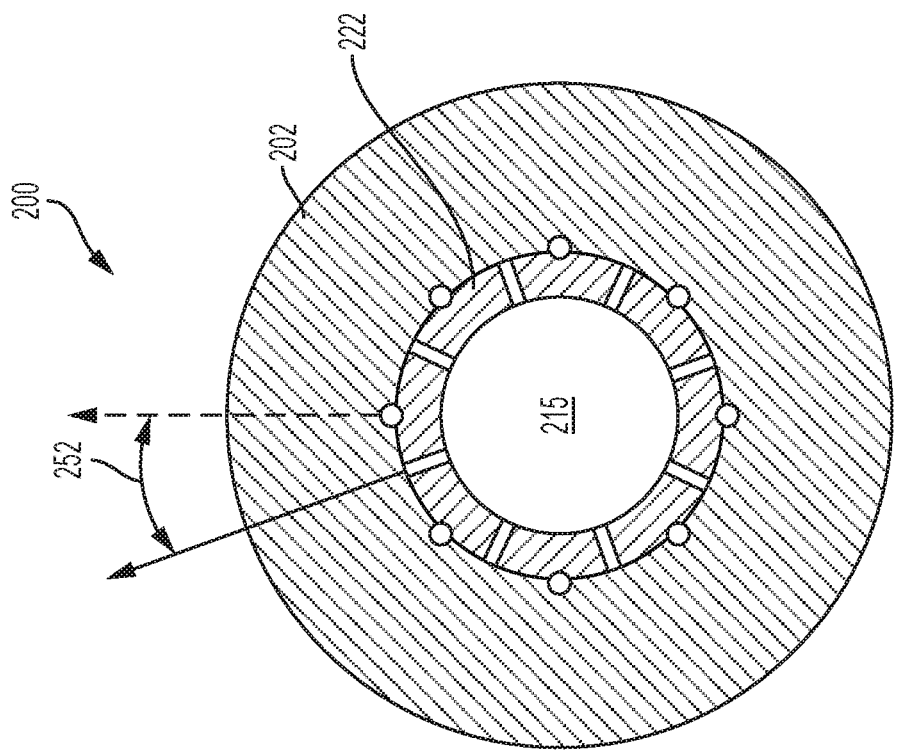
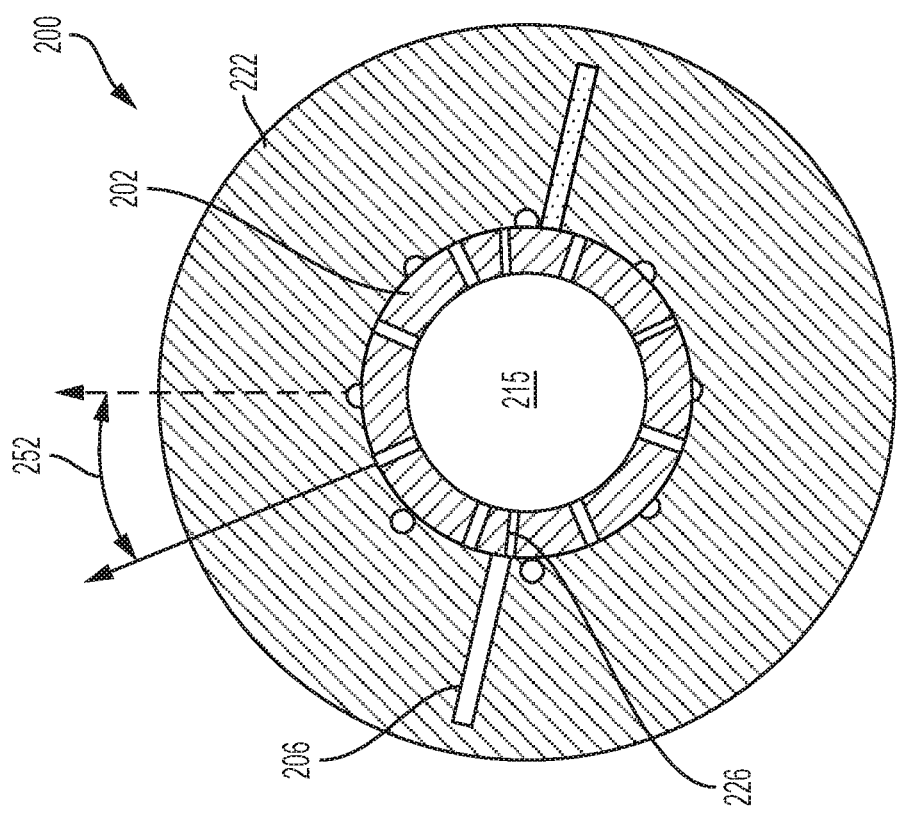
FIG. 5A
FIG. 5B

US 10,605,153 B2

FUEL INJECTOR HAVING THREE STAGES

FIELD

The present invention relates to fuel injectors, and in particular to a fuel injector having a prechamber and three stages.

BACKGROUND/SUMMARY

During the operation of combustion engines the quality of the combustion events depends on various conditions. One condition is how well the fuel is mixed with air in the combustion chamber. A poor air fuel mix may yield unwanted soot, and/or hydrocarbon emissions. This may be, in particular, during cold starts.

Fuel injectors have been used to inject fuel into the combustion chambers of engines, typically at high velocity in an attempt to atomize the fuel. However, fuel injectors may still provide disappointing air fuel mixing. In addition, long spray penetration, often characteristic of the injectors, may result in the spray hitting the combustion chamber wall, which, especially in cold engine conditions, may tend to keep the fuel at a cooler, liquefied, state.

U.S. Pat. No. 7,458,364 to Allen discloses a fuel injection system wherein an attempt is made to improve atomization. The '364 disclosure includes a so called mixing chamber into which a positive displacement pump injects a measured amount of fuel. An air, or exhaust gas, conduit provides a gaseous make-up volume to the mixing chamber as a partial vacuum is produced in the adjacent combustion chamber to pull exhaust gas and fuel into the combustion chamber in a combined stream in an attempt to entrain the fuel into the exhaust stream. The vacuum is created in the combustion chamber by delaying the opening of an inlet valve as the piston starts a downward stroke. The mixing chamber includes an atomizing nozzle at an outlet side thereof, to accelerate the flow.

This approach has a number of shortcomings. For one, the '364 system requires a very particular operation of the charge air inlet valve in order to create a vacuum in the combustion chamber to cause air or exhaust to flow through the mixing chamber to entrain the fuel. The '364 design is intended to be used with smaller single cylinder engines that do not include a fuel pump. The positive displacement pump is designed for metered injection, not for increased pressure. In addition, there appears to be a relatively short time during which the fuel is exposed to the passing air or exhaust flow. There also appears to be little time for any appreciable heat transfer between the fuel and exhaust. The stream of exhaust and stream of fuel appear to be merely blended. It appears the fuel only becomes atomized as it passes from the atomizing nozzle into the combustion chamber within the blend.

The inventors herein disclose an engine, a fuel injector, and a method of injecting fuel into a combustion chamber of the engine that provides an improved air-fuel mixture. The method may include rotating an inner element relative an injector body a first rotational amount and aligning an exhaust gas passage with an exhaust gas source to allow exhaust gas to enter a pre-chamber for a first duration. The method may also include rotating the inner element relative the injector body a second rotational amount and aligning a fuel passage with a fuel source to allow fuel to enter the pre-chamber for a second duration. The method may also include rotating the inner element relative the injector body a third rotational amount and aligning injector nozzle connectors with injector nozzles, for a third duration, to allow a mixture of the fuel and the exhaust gas to be injected from the pre-chamber to the combustion chamber. Embodiments may provide a three-stage (exactly three-stages in one example) fuel injector configuration which introduces hot exhaust flow inside a pre-chamber inside the injector pin to promote fuel evaporation before being injected into combustion cylinder.

In this way, more significant exposure of fuel to warmed exhaust gas may be accomplished via a predetermined temporal exposure, and via sufficient spatial exposure. In this way, the fuel may be warmed in the prechamber. The fuel may be provided with sufficient heat transfer exposure with a supply of exhaust gas to effectively heat the fuel to advantageous levels. Also in this way, the fuel may be evaporated in the heated exhaust gas.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5A and 5B are partial schematic cross-sectional views of the fuel injector shown in FIG. 2 taken respectively at lines 3A-3A and 3B-3B showing the injector in second stage.

DETAILED DESCRIPTION

Figure 1:
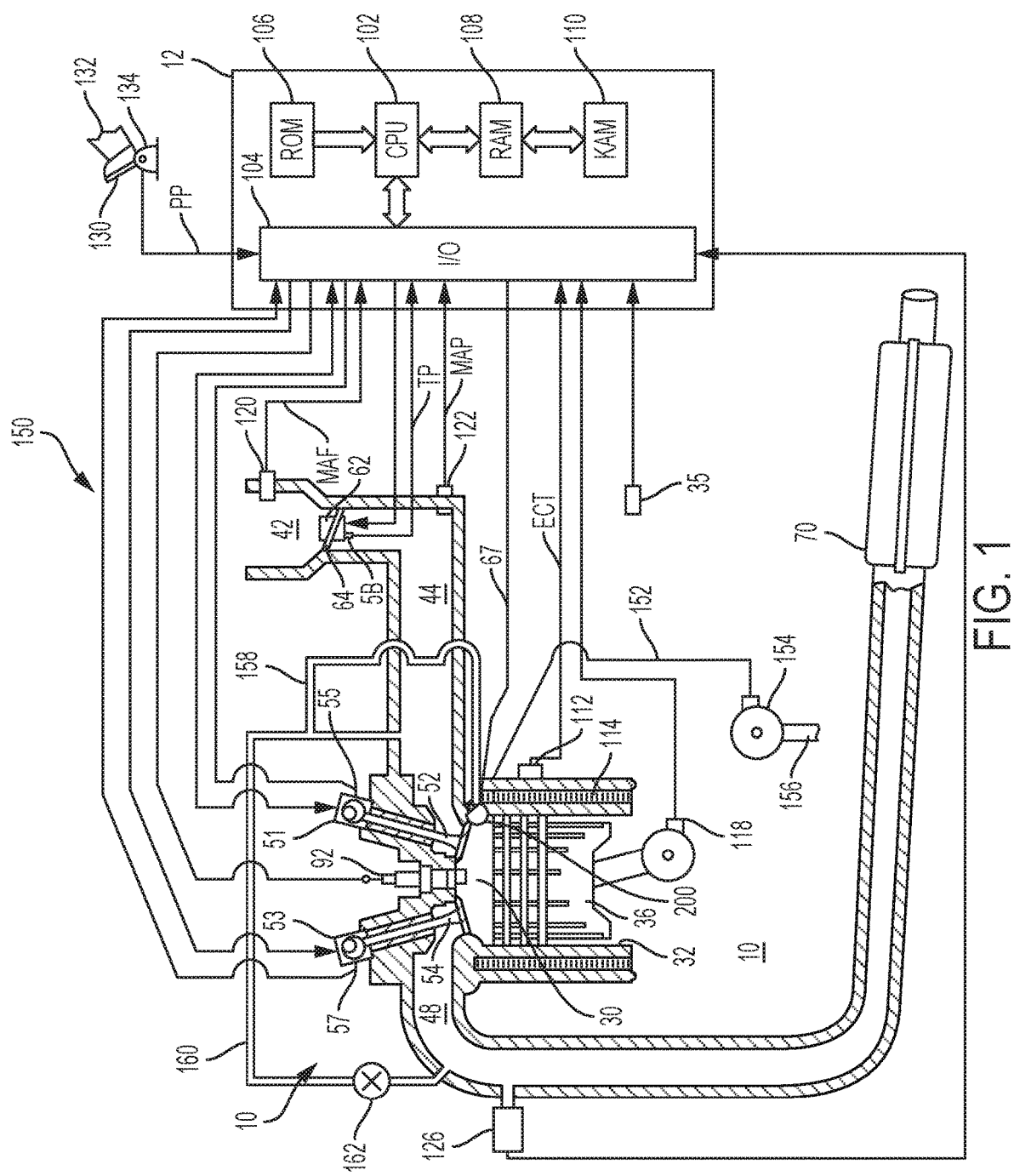
FIG. 1 is a schematic system diagram of an engine in accordance with the present disclosure.
Figure 2:
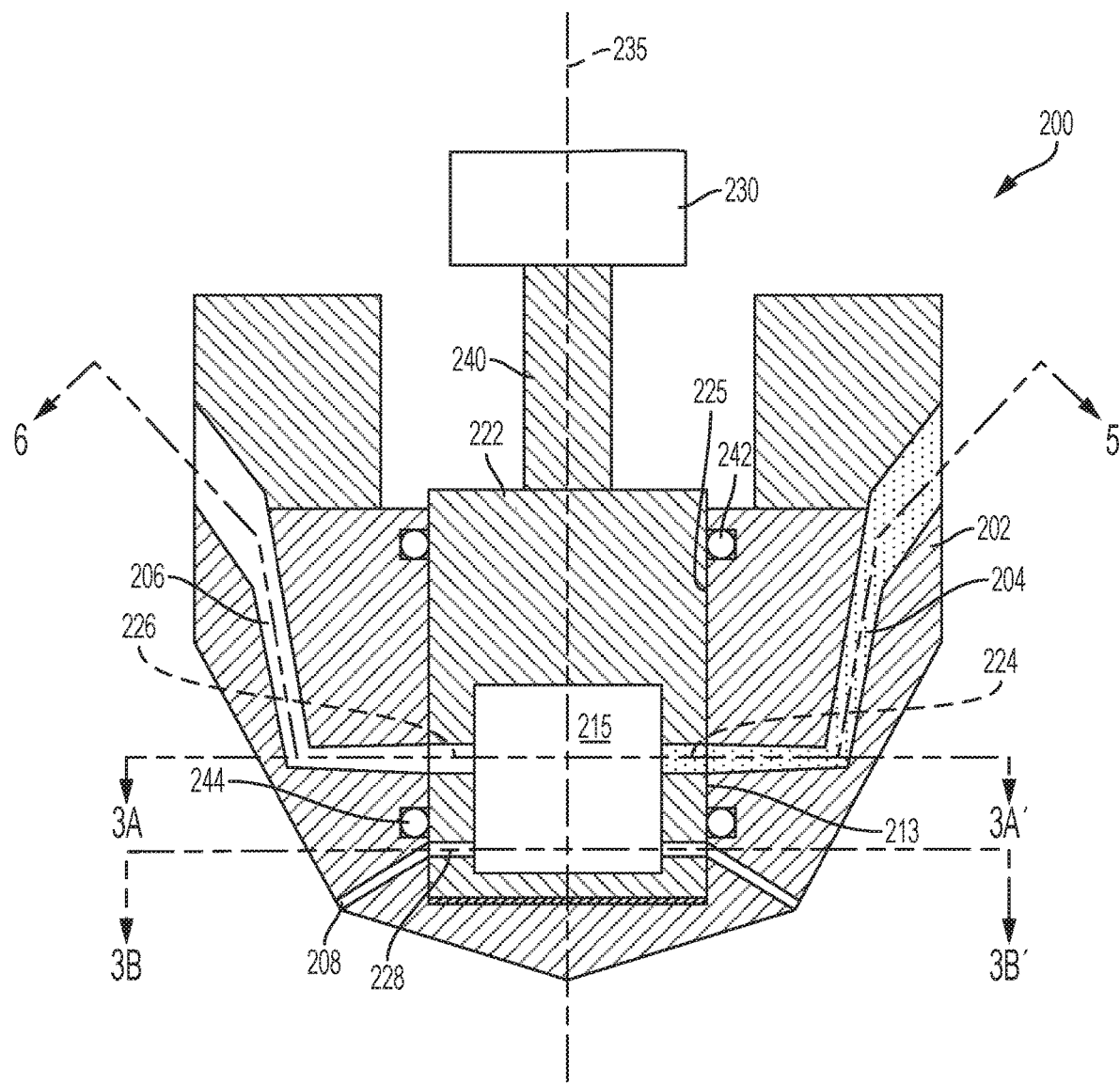
FIG. 2 is a partial schematic cross-sectional drawing of a fuel injector in accordance with the present disclose.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to a crankshaft 40. A flywheel may be coupled to the crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 may deliver a liquid fuel in proportion to the pulse width of signal from controller 12. Fuel is delivered to fuel injector 66 by a fuel system (not shown) including a fuel tank, fuel pump, and fuel rail (not shown).

Intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bars. Alternatively, a high pressure, dual stage, fuel system may be used to generate higher fuel pressures.

In some examples, throttle 62 and throttle plate 64 may be positioned between intake valve 52 and intake manifold 44 such that throttle 62 is a port throttle.

An ignition system 88 may provide an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

In another example, the engine may be coupled to an electric motor/battery system in a hybrid vehicle. Further, in some examples, other engine configurations may be employed, for example a diesel engine.

Catalytic converter 70 can include multiple catalyst bricks, in one example. In another example, multiple emission control devices, each with multiple bricks, can be used. Catalytic converter 70 can be a three-way type catalyst in one example. A temperature of catalytic converter 70 may be measured or estimated via engine speed, engine load, engine coolant temperature, and spark timing.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; a measure of road grade from inclinometer 35, and a measurement of throttle position from sensor 58. Barometric pressure may also be sensed (sensor not shown) for processing by controller 12.

In a preferred aspect of the present description, engine position sensor 118 produces a predetermined number of equally spaced pulses every revolution of the crankshaft from which engine speed (RPM) can be determined.

In another example, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. In example diesel applications, the fuel may be combusted via auto ignition via increases compression. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. Engine control may be performed on a cylinder-by-cylinder basis to control the engine torque output.

Various embodiments may provide an engine system 150 that may include a combustion chamber 30 for combusting an air-fuel mixture. A fuel line 152 may be included to supply a high pressure fuel for combustion in the combustion chamber 30. The engine system 150 may include a fuel pump 154 configured to move fuel from a fuel tank (not shown) via an upstream fuel line 156. The fuel pump 154 may also pressurize the fuel to thereby provide the high pressure fuel.

A junction line 158 may be provided to port a portion of exhaust gas from the combustion chamber 30. The junction line 158 may be fluidically coupled with an exhaust gas recirculation (EGR) line 160. An EGR valve 162 may be provided to at least partially regulate the EGR system. The junction line 158 may also include a regulating mechanism, such as a valve (not shown). In some embodiments, the junction line 158 may be fluidically coupled to the engine exhaust in other ways that may not include an EGR line.

FIGS. 2-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring now, also, to FIGS. 2-6B, the engine system 150 may include a fuel injector 200. The fuel injector 200 may include an injector body 202 and an inner element 222 disposed within and rotatable relative to the injector body 202. A prechamber 215 may be defined within the inner element 222 between portions of the inner element 222 and the injector body 202. The inner element 222 may be rotatable to selectively align a first passage 224 between the prechamber 215 and the junction line 158 to allow exhaust gas to pass into the prechamber 215. The inner element 222 may also, be rotatable to selectively align a second passage 226 between the prechamber 215 and the fuel line 152 to pass a fuel into the prechamber 215. The first and second passages may include one or more segments that may be alignable to enable fluid to pass through. The inner element 222 may also be rotatable to selectively align one or more injector nozzle connectors 228 between the prechamber and the one or more injector nozzles 208 to inject a fuel-exhaust gas mixture from the prechamber into the combustion chamber 30. The selective rotation of the inner element 222 relative the injector body 202 may be controlled directly, or indirectly, by the controller 12. The rotation may effected by an actuator 230 such as a coil, or the like.

The inner element 222 may include a substantially cylindrical outer wall 213, or chamber wall 213 surrounding and defining the mixing chamber 215. The one or more injector nozzle connectors 228 may be, for example, eight injector nozzle connectors 228 extending radially through the outer wall 213 at eight substantially equal circumferential intervals. The injector body 202 may include a substantially cylindrical body wall 233 surrounding the substantially cylindrical outer wall 213 of the inner element 222. Similarly, the one or more injector nozzles 208 may be eight injector nozzles 208 that may extend radially outward and longitudinally toward a middle region of the combustion chamber 30. For example they may form an angle with a central axis 235 of the injector body 202.

As noted, the injector body 202 may have a central axis 235. The inner element 222 may also have a central axis which may be coincident with the injector body 202 central axis 235. Alternatively, the inner element 222 central axis may be offset from, parallel with, or make an angle with the injector body 202 central axis 235. In the example embodiment illustrated, the central axis 235 is located central to the cylindrical outer, or chamber wall 213. The exhaust gas nozzle 224 and the fuel nozzle 226 may be located at a first longitudinal location relative to the central axis 235, and the one or more injector nozzle connectors 228 may be located at a second longitudinal location relative to the central axis 235. The second longitudinal location may be different from the first longitudinal location; i.e. the exhaust gas nozzle 224 and the fuel nozzle 226 may pass through a first plane, and the one or more injector nozzle connectors 228 may pass through a second plane. The central axis 235 may be normal to both the first and second planes, and the first and second planes may be parallel with each other.

Figure 3B:
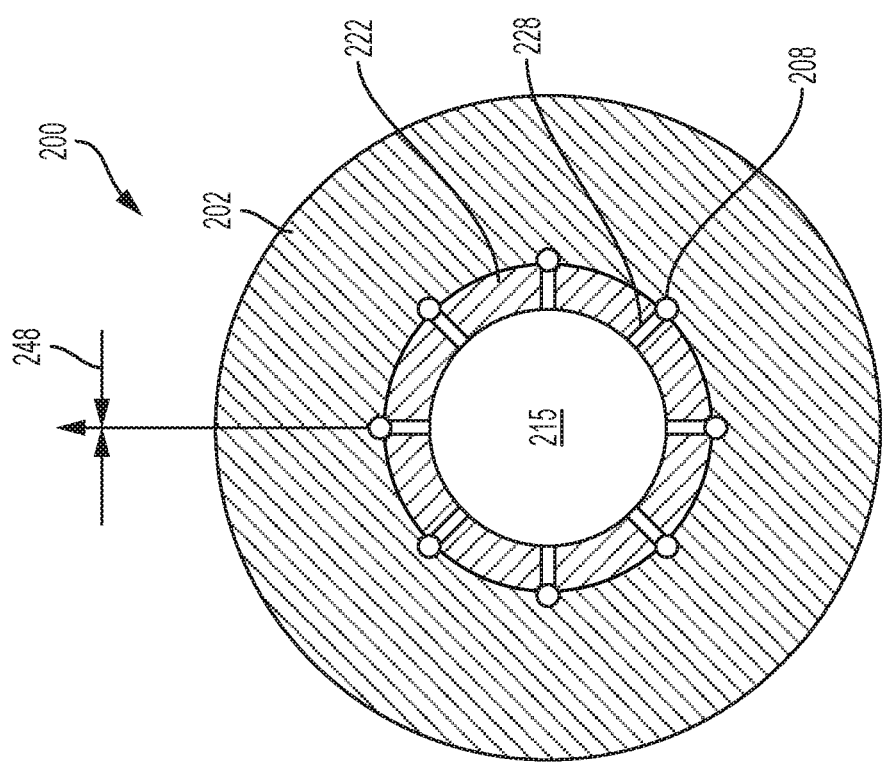
FIGS. 3A and 3B are partial schematic cross-sectional views of the fuel injector shown in FIG. 2 taken respectively at lines 3A-3A and 3B-3B showing the injector in an off position.
Figure 3A:
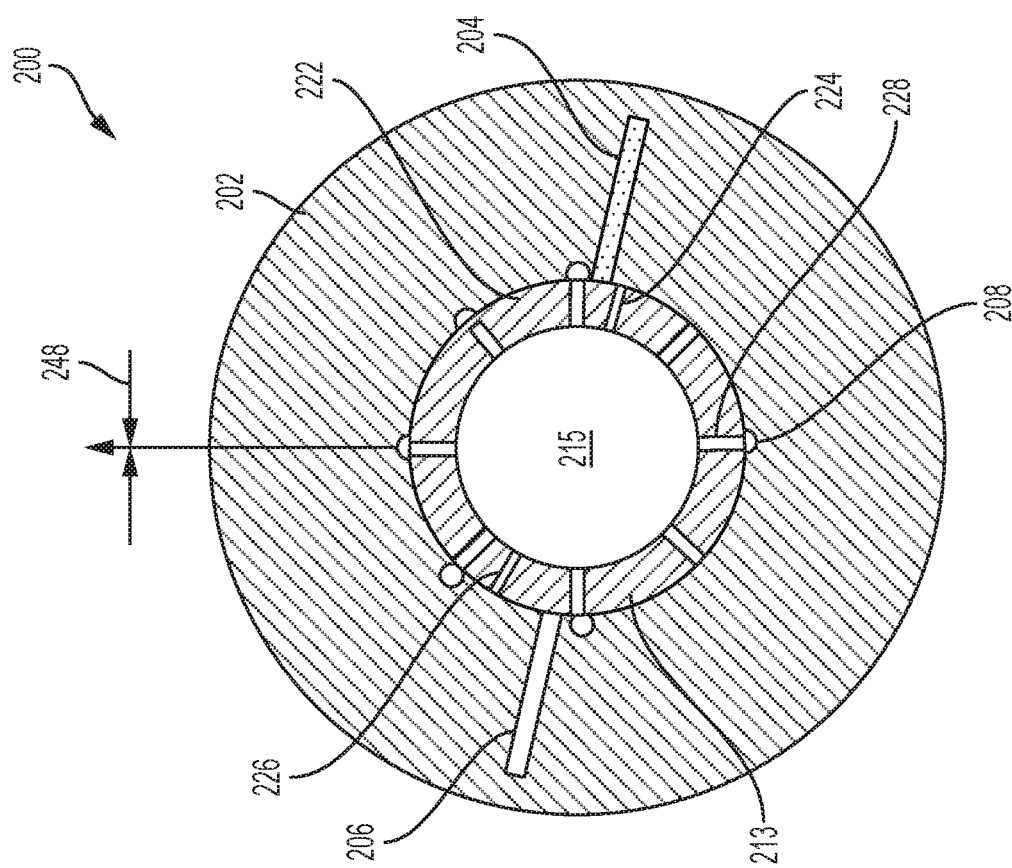
Figure 4B:
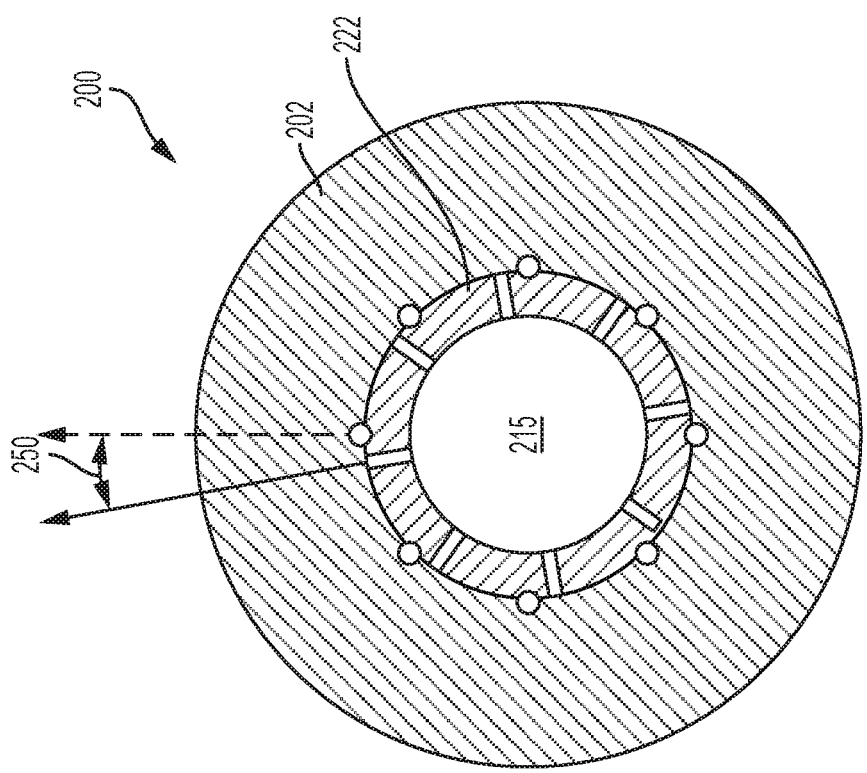
FIGS. 4A and 4B are partial schematic cross-sectional views of the fuel injector shown in FIG. 2 taken respectively at lines 3A-3A and 3B-3B showing the injector in first stage.
Figure 4A:
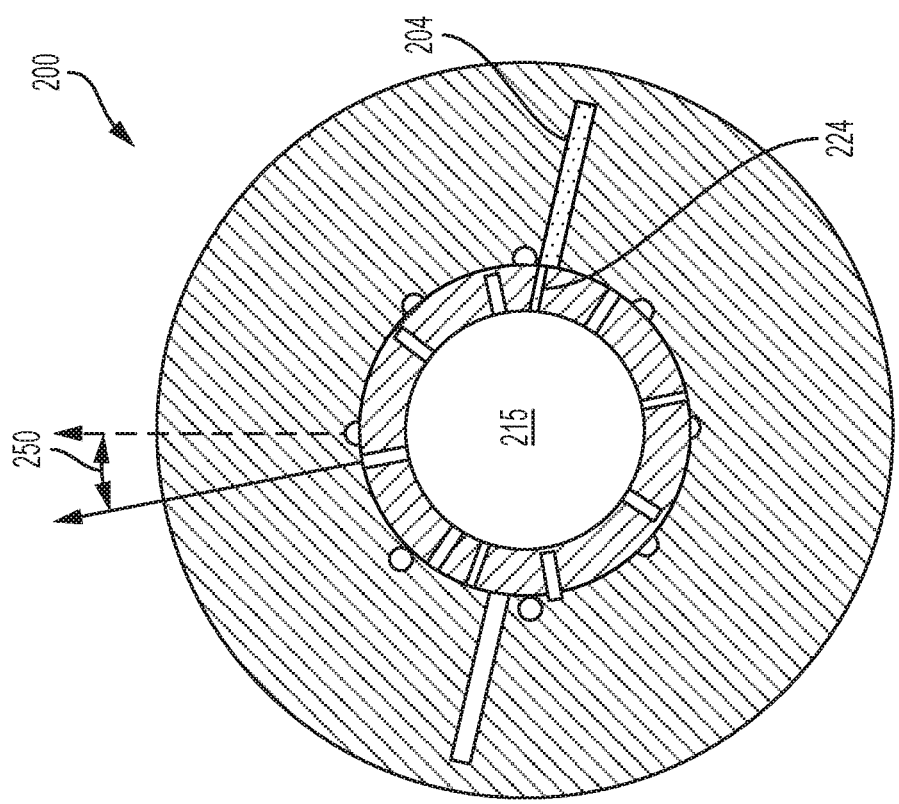
Figure 6B:
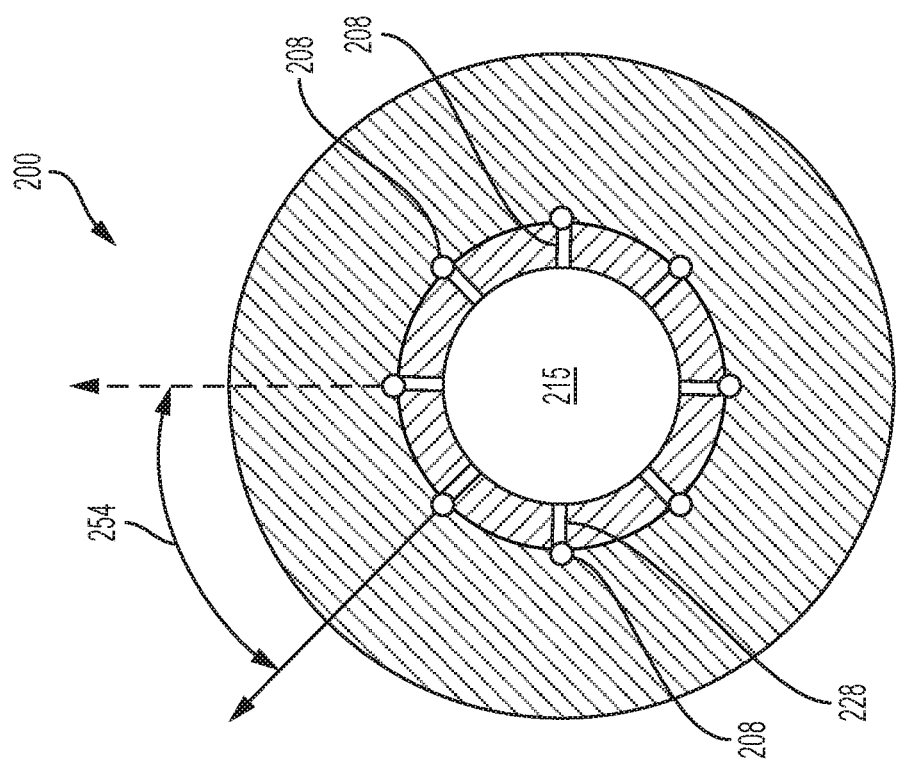
FIGS. 6A and 6B are partial schematic cross-sectional views of the fuel injector shown in FIG. 2 taken respectively at lines 3A-3A and 3B-3B showing the injector in third stage.
Figure 6A:
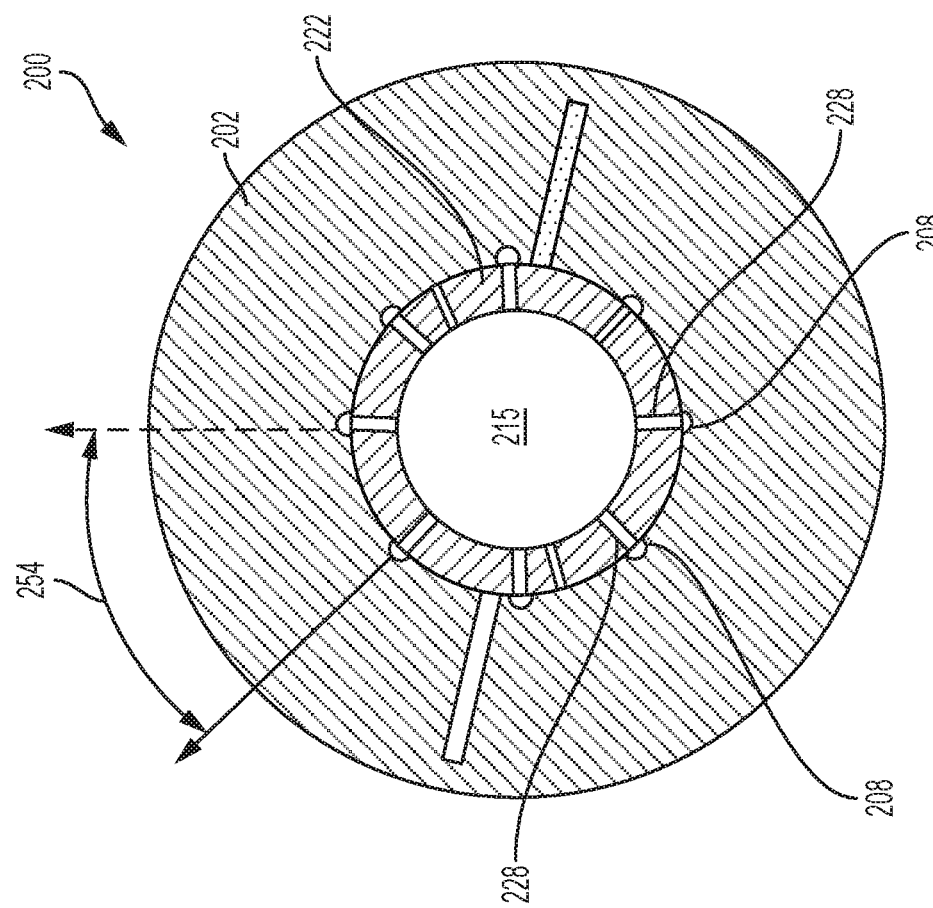
Figure 7:
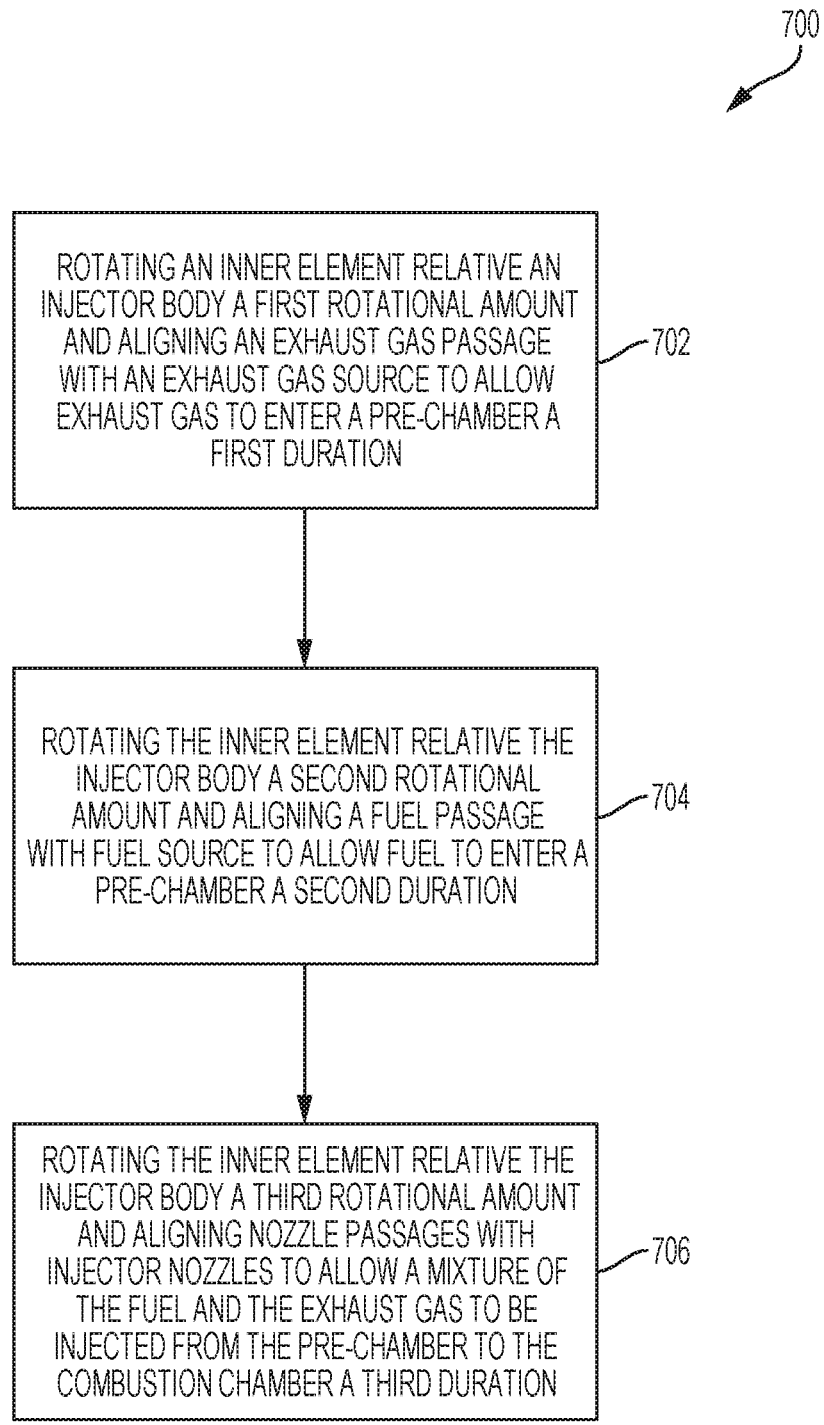
FIG. 7 is a flow diagram illustrating method in accordance with the present disclose.

FIGS. 3A and 3B illustrate the inner element 222 positioned in the injector body 202 at a starting, or closed, or zero angle 248 position wherein neither exhaust gas nor fuel may enter the prechamber 215. FIGS. 4A and 4B illustrate the inner element 222 positioned in the injector body 202 at a first stage position wherein the inner element 222 is rotated a first angle 250 to allow exhaust gas to enter the prechamber 215. FIGS. 5A and 5B illustrate the inner element 222 positioned in the injector body 202 at a second stage position wherein the inner element 222 is rotated a second angle 252 to allow fuel to enter the prechamber 215. FIGS. 6A and 6B illustrate the inner element 222 positioned in the injector body 202 at a third stage position wherein the inner element 222 is rotated to a third angle 254 to allow fuel-exhaust gas mixture to be ejected from the prechamber 215 and injected into a combustion chamber 30. These figures also show example relative spacing, or orientation of the respective passages, connectors, and nozzles.

The exhaust gas nozzle 224 and the fuel nozzle 226 may extend radially through the cylindrical outer wall, or chamber wall 213, and may be angularly spaced from one another by, for example, approximately 11 degrees. In addition, one of the at least one injector nozzle connectors 228 may be angularly spaced from the fuel passage by, for example, approximately 23 degrees. The one or more injector nozzle connectors 228 may be eight injector nozzle connectors 228 angularly spaced from one another by approximately 45 degrees.

Various embodiments may also include an injector needle 240 that may be configured to pass into the prechamber 215 to force the fuel-exhaust gas mixture out of the prechamber 215 through the injector nozzles 208 and into the combustion chamber 30.

As noted, in some cases, the junction line 158 is configured to receive exhaust gas from an EGR line 160 downstream from an exhaust manifold 48. A plurality of similarly configured exhaust passages downstream from a plurality of similarly configured combustion chambers 30 may fluidically join into a collective flow path.

Embodiments may provide a fuel injector 200 that may include an injector body 202 defining passages therethrough. The passages may include one or more exhaust gas passages 204, one or more fuel passages 206, and one or more injector nozzles 208. The fuel injector 200 may also include an inner element 222 having a chamber wall 213 defining a pre-chamber 215 therein. The chamber wall 213 may have passages therethrough. The passages may include one or more exhaust gas nozzles 224, one or more fuel nozzles 226, and one or more injector nozzle connectors 228. The inner element 222 may disposed substantially inside the injector body 202 and may be movable relative to the injector body 202 to selectively align: the one or more exhaust gas nozzles 224, with the one or more exhaust gas passages 204, the one or more fuel nozzles 226 with the one or more fuel passages 206, and the one or more injector nozzle connectors 228 with the one or more injector nozzles 208 in order to inject a mixture of fuel and exhaust gas into a combustion chamber 30 of an engine 10. After injection of the fuel-exhaust gas mixture the inner element 222 may rotate back to the zero angle position, or it may not. Embodiments may provide a fuel injector 200 wherein the inner element 222 is rotatable inside the injector body 202 to align, with successive rotational movements: one exhaust gas nozzle 224 with one exhaust gas passage 204, one fuel nozzle 226 with one fuel passage 206, and one or more injector nozzle connectors 228 with the one or more injector nozzles 208.

Referring in particular to FIG. 1, in some embodiments the inner element 222 has a substantially cylindrical outer wall 213 defining the prechamber 215 therein. The inner element 222 may be pivotal about a central axis 235 of the injector body 202. The one or more exhaust gas nozzles 224 may be one exhaust gas nozzle 204 that may pass radially through the outer wall 213 at a first circumferential location of the inner element outer wall 213 and at a first longitudinal location. Similarly, the one or more fuel nozzles 226 may be one fuel nozzle 226 that passes radially through the outer wall 213 at a second circumferential location of the inner element outer wall 213 and at the first longitudinal location. The one or more injector nozzle connectors 228 may pass radially through the inner element outer wall 213 at a second longitudinal location.

The injector body 202 may define a space 225 therein into which the inner element 222 may be disposed to fit. A sealing elements, for example a first O-ring 242 may be positioned in the space 225 in sealing engagement with the inner element outer wall 213 above the exhaust gas nozzle 224, the exhaust gas passage 204, the fuel nozzle 226, and fuel passage 206, to prevent or reduce leakage of exhaust gas or fuel. A second O-ring 244 may be positioned in the space 225 in sealing engagement with the inner element outer wall 213 below the exhaust gas nozzle 224 but above the injector nozzle connectors 228 and the injector nozzles 208. In this way leakage of the fuel exhaust gas mixture, and/or direct flow from the exhaust gas passage 204 and fuel passage 206 may be prevented, or reduced.

The one or more injector nozzle connectors 228 may be eight injector nozzle connectors 228 that may pass radially through the outer wall 213 at eight substantially evenly spaced circumferentially locations. The one of the injector nozzle connectors may define a second angle with fuel nozzle and the fuel nozzle make a first nozzle with exhaust gas nozzle, and wherein a sum of the first angle 250 and the second angle 252 is substantially equal to the third angle 254 which may be for example, 45 degrees.

Embodiments may provide a method 700 of injecting fuel into a combustion chamber of an engine. The method 700 may include, at 702, rotating an inner element relative an injector body a first rotational amount and aligning an exhaust gas passage with an exhaust gas source to allow exhaust gas to enter a pre-chamber for a first duration. The method 700 may include, at 704, rotating the inner element relative the injector body a second rotational amount and aligning a fuel passage with a fuel source to allow fuel to enter the pre-chamber for a second duration. The method 700 may also include, at 706 rotating the inner element relative the injector body a third rotational amount and aligning injector nozzle connectors with injector nozzles to allow a mixture of the fuel and the exhaust gas to be injected from the pre-chamber to the combustion chamber for a third duration. With some embodiments the method 700 may include moving an injection needle 240 into the pre-chamber 215 to force the mixture of the fuel and exhaust gas into the combustion chamber.

With some embodiments the aligning the exhaust gas passage with the exhaust gas source may be effected by rotating the inner element relative the injector body 11 degrees; the aligning the fuel passage with the fuel source may be effected by rotating the inner element relative the injector body another 11 degrees; and the aligning injector nozzle connectors with injector nozzles may be effected by rotating the inner element relative the injector body 23 degrees.

The sum of the first rotational amount plus the second rotational amount plus the third rotational amount may be substantially equal to 360 degrees divided by a number of nozzle passages equally radially spaced around a circumference of the nozzle body. For example the number of nozzle passages may be eight, and the sum of the first rotational amount plus the second rotational amount plus the third rotational amount may be substantially equal to 45 degrees.

As noted the inner element 222 may be rotated to, and therefore oriented relative the injector body 202, into the respective first, second, and third stages for predetermined time durations. In this way effective mixing and/or thermal transfer may be accomplished. For example, the first predetermined duration may be 10 ms, the second predetermined duration may be 15 ms and the third predetermined duration may be 60 ms.

It will be appreciated by those skilled in the art that although the present disclosure has been described by way of example with reference to one or more embodiments it is not limited to the disclosed embodiments and that one or modifications to the disclosed embodiments or alternative embodiments could be constructed without departing from the scope of the present disclosure.

Accordingly, it will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of injecting fuel into a combustion chamber of an engine comprising:
    rotating an inner element relative to an injector body a first rotational amount and aligning an exhaust gas nozzle with an exhaust gas passage and an exhaust gas source to allow exhaust gas to enter a pre-chamber for a first duration;
    rotating the inner element relative to the injector body a second rotational amount and aligning a fuel nozzle with a fuel passage and a fuel source to allow fuel to enter the pre-chamber for a second duration; and
    rotating the inner element relative to the injector body a third rotational amount and aligning injector nozzle connectors with injector nozzles for a third duration to allow a mixture of the fuel and the exhaust gas to be injected from the pre-chamber into the combustion chamber, the injector nozzle connectors extending radially through an outer wall of the inner element.

2. The method of claim 1, further comprising moving an injection needle into the pre-chamber to force the mixture of the fuel and the exhaust gas into the combustion chamber.

3. The method of claim 1, wherein:
    the aligning the exhaust gas passage with the exhaust gas source is effected by rotating the inner element relative to the injector body 11 degrees;
    the aligning the fuel passage with the fuel source is effected by rotating the inner element relative to the injector body another 11 degrees; and
    the aligning the injector nozzle connectors with the injector nozzles is effected by rotating the inner element relative to the injector body 23 degrees.

4. The method of claim 1, wherein a sum of the first rotational amount, the second rotational amount, and the third rotational amount is substantially equal to 360 degrees divided by a number of nozzle passages equally radially spaced around a circumference of the injector body.

5. The method of claim 1, wherein a sum of the first rotational amount, the second rotational amount, and the third rotational amount is substantially equal to 45 degrees.

6. The method of claim 1, wherein the first duration is 10 ms, the second duration is 15 ms, and the third duration is 60 ms.

7. The method of claim 1, wherein the fuel is high pressure fuel supplied through a fuel line to the combustion chamber, and wherein the injector body is included in a fuel injector and the fuel is pressurized before entering the fuel injector by a fuel pump.

8. The method of claim 1, wherein the inner element includes the outer wall surrounding and defining the pre-chamber, the outer wall being substantially cylindrical, and the injector nozzle connectors include eight injector nozzle connectors extending radially through the substantially cylindrical outer wall at eight substantially equal circumferential intervals; and
    wherein the injector body includes a substantially cylindrical body wall surrounding the substantially cylindrical outer wall of the inner element, and the injector nozzles include eight injector nozzles extending radially outward and longitudinally toward a middle region of the combustion chamber.

9. The method of claim 8, wherein the inner element has a central axis located central to the substantially cylindrical outer wall, and further comprising the exhaust gas nozzle and the fuel nozzle located at a first longitudinal location relative to the central axis, and wherein the injector nozzle connectors are located at a second longitudinal location relative to the central axis different from the first longitudinal location.

10. The method of claim 9, wherein the exhaust gas nozzle and the fuel nozzle extend radially through the substantially cylindrical outer wall angularly spaced from one another by 11 degrees.

11. The method of claim 9, wherein one of the injector nozzle connectors is angularly spaced from the fuel passage by approximately 23 degrees.

12. The method of claim 1, wherein the injector nozzle connectors include eight injector nozzle connectors angularly spaced from one another by approximately 45 degrees.

13. A method, comprising:
    rotating an inner fuel injector element relative to an injector body of a fuel injector a first amount and aligning an injector exhaust gas passage with an exhaust gas source via an exhaust gas nozzle radially extending through an outer wall of the inner fuel injector element;
    rotating the inner fuel injector element a second amount and aligning a fuel passage with a fuel source via a fuel nozzle radially extending through the outer wall of the inner fuel injector element; and
    rotating the inner fuel injector element a third amount and aligning injector nozzle connectors with injector nozzles to inject a fuel and exhaust gas mixture from a pre-chamber to a cylinder, the injector nozzle connectors radially extending through the outer wall of the inner fuel injector element.

14. The method of claim 13, wherein the inner fuel injector element is rotatable inside the injector body to align, with successive rotational movements: the exhaust gas nozzle with the injector exhaust gas passage, the fuel nozzle with the fuel passage, and the injector nozzle connectors with the injector nozzles.

15. The method of claim 14, wherein the inner fuel injector element has a substantially cylindrical outer wall defining the pre-chamber therein, the inner fuel injector element being pivotable about a central axis of the injector body, and wherein the exhaust gas nozzle passes radially through the substantially cylindrical outer wall at a first circumferential location and a first longitudinal location; wherein the fuel nozzle passes radially through the substantially cylindrical outer wall at a second circumferential location and the first longitudinal location, and wherein the injector nozzle connectors pass radially through the substantially cylindrical outer wall at a second longitudinal location.

16. The method of claim 13, wherein the injector nozzle connectors include eight injector nozzle connectors that pass radially through the substantially cylindrical outer wall at eight substantially evenly spaced circumferential locations, wherein one of the injector nozzle connectors defines a second angle with the fuel nozzle and the fuel nozzle makes a first angle with the exhaust gas nozzle, and wherein a sum of the first angle and the second angle is substantially equal to 45 degrees.

17. The method of claim 13, further comprising a fuel line to supply a high pressure fuel for combustion in a combustion chamber, wherein the fuel is pressurized before entering the fuel injector by a fuel pump, and a junction line to port a portion of exhaust gas from the combustion chamber.

* * * * *